May 14, 1968   L. H. CUTLER   3,382,885
ANTI-SIPHON VALVE
Filed May 22, 1963   2 Sheets-Sheet 1
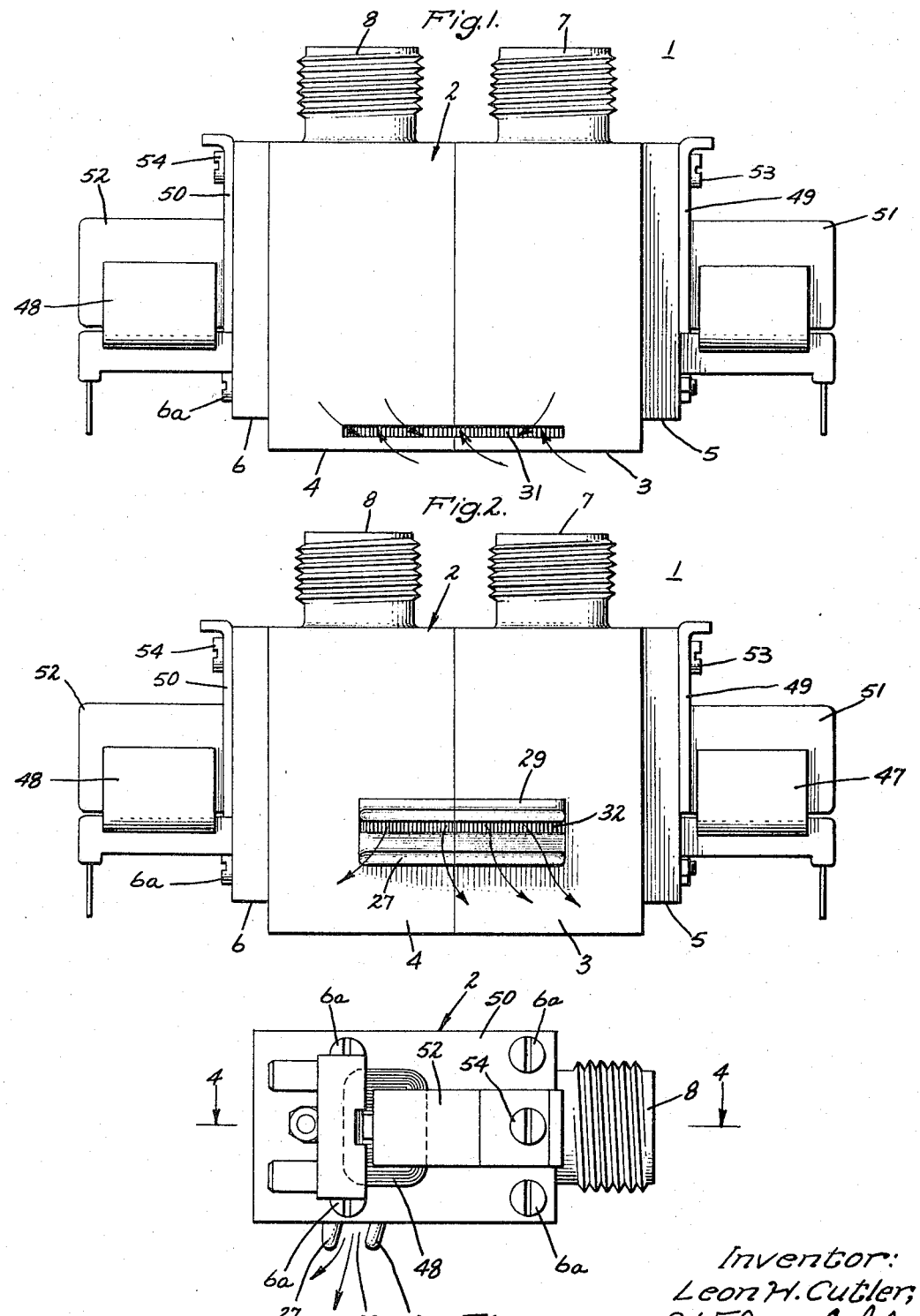
Inventor:
Leon H. Cutler,
by H. F. Manbeck, Jr.
Attorney.

May 14, 1968 L. H. CUTLER 3,382,885
ANTI-SIPHON VALVE
Filed May 22, 1963 2 Sheets-Sheet 2
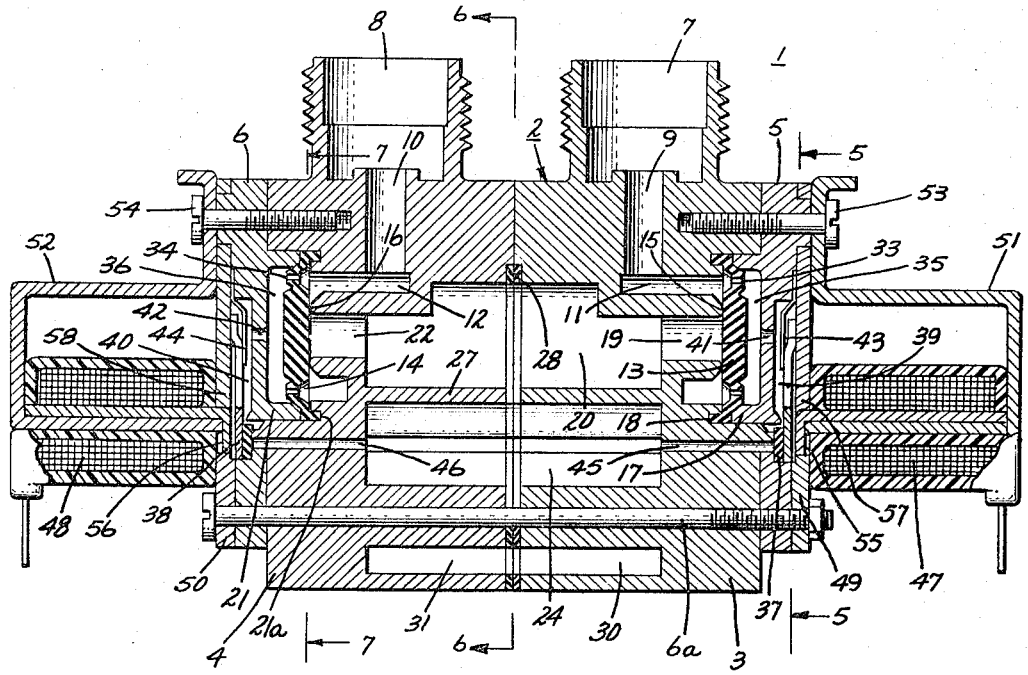
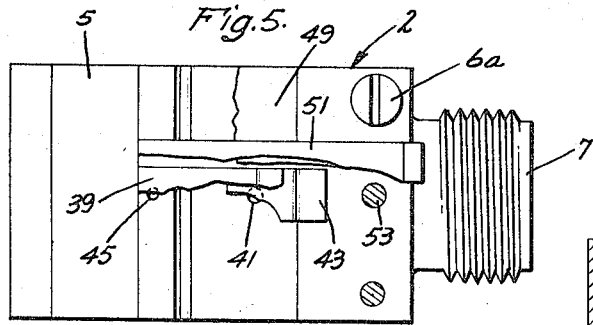
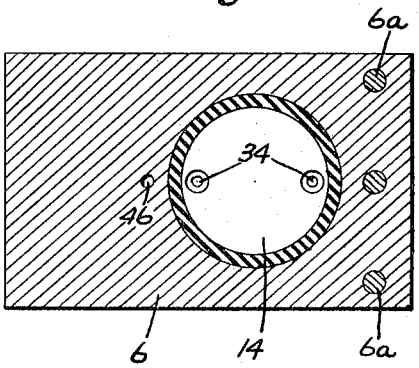
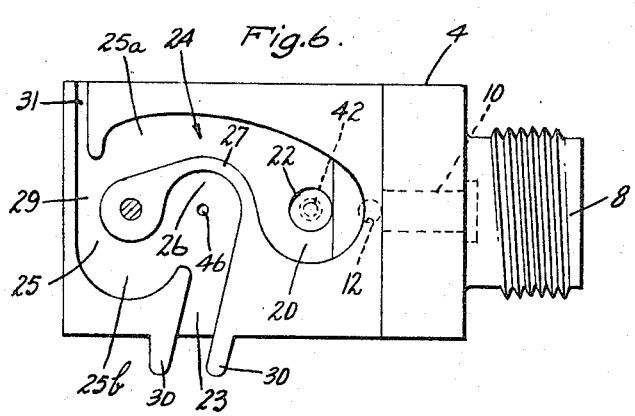
Inventor:
Leon H. Cutler,
by H. F. Manbeck, Jr.
Attorney.

United States Patent Office 3,382,885
Patented May 14, 1968

3,382,885
ANTI-SIPHON VALVE
Leon H. Cutler, New Haven, Conn., assignor to General
Electric Company, a corporation of New York
Filed May 22, 1963, Ser. No. 282,466
1 Claim. (Cl. 137—216.1)

My invention relates to valve structures and more particularly to inlet and mixing valves for use with domestic appliances such as automatic clothes washers.

Automatic clothes washers customarily include solenoid actuated valves for controlling the filling of the machine with water. The valves are ordinarily of the mixing valve type and they are arranged so that they will deliver either hot or cold water, or a mixture of both to the machine as selected by the housewife. In the past, the valves have been mounted in the machine so that there is a positive air gap between them and the tub enclosure of the machine. This air gap is undesirable for several reasons; for example, it may increase the space required for the inlet water system and it may cause spillage or leakage from the machine if the water pressure decreases to a very low level during the filling operation. Also, there is the added cost of the parts necessary, and the possible deterioration of these parts with age and service. However, despite these disadvantages, the air gap has been necessary to assure that there will not be reverse siphoning of suds into the inlet water lines if somehow a suction pressure should be applied to the inlet water lines while the valve is open for filling the machine and the tub is overflowing with suds or foam.

A suction pressure in the inlet water lines is not likely but there is always the possibility that it will occur with any given machine leaving the manufacturer. For example, the washer may be used on an upper floor of an apartment house. If the water pressure is lost during filling, as by a break in the basement, a suction will occur on the water lines or pipes leading to the upper floors and this suction will attempt to draw suds or liquid from the tub enclosure into the valve and the lines. By the provision of the air gap, the suction pressure pulls in air rather than suds and thereby contamination of the water line is avoided.

As explained above, however, it would be desirable for other reasons if the physical components providing for the air gap could be eliminated and therefore it is an object of my invention to provide an improved valve which can empty directly into the tub enclosure of a washing machine without an air gap between the valve and tub being required to guard against reverse siphoning.

It is another object of my invention to provide an improved water valve in which anti-siphon venting means are formed integrally in the valve structure for guarding against reverse siphoning.

It is another object of my invention to provide an improved water valve in which anti-siphon venting means are formed integrally in the valve structure for guarding against reverse siphoning.

A further object of my invention is to provide a compact anti-siphon valve of limited height and depth, which requires only a small mounting space within a washing machine.

In carrying out my invention in one form thereof, I provide a water valve having a plastic valve body. The valve body includes a valve seat and an inlet which leads to the seat. A pilot operated diaphragm is arranged to engage the valve seat, thereby to control the flow through the valve, and a discharge passageway is provided in the valve body leading away from the seat. The discharge passageway includes a reverse curve section connected to the valve seat, an outlet from the valve body and an angle section which joins the reverse curve section to the outlet. The discharge passageway thus forms a serpentine path between the valve seat and the outlet, and at the reverse curve section of this path, a transverse vent passageway is extended to the surface of the valve. This vent passageway is open to the air and being more directly connected to the valve seat than is the outlet at the end of the serpentine discharge path, it is effective to pass air into the valve if a suction pressure should be applied at the valve inlet while the valve diaphragm is open. With air coming in through the vent passage, the valve does not draw in suds or liquid from the outlet through the serpentine discharge path and thereby an anti-siphon effect is provided integrally in the valve. The vent passage does not cause leakage from the valve under normal operating conditions as the water then sweeps by it under pressure toward the outlet.

The subject matter which I regard as my invention is claimed in the concluding portion of this specification. My invention, however, both as to organization and method of operation together with further objects and advantages thereof may be best understood by reference to the following description taken in conjunction with the accompanying drawings in which:

FIG. 1 is a top view of a valve embodying my invention in one form thereof;

FIG. 2 is a bottom view of the valve of FIG. 1;

FIG. 3 is a side view of the valve looking at it from the left side as viewed in FIG. 1;

FIG. 4 is a cross sectional view taken on the line 4—4 of FIG. 3 showing the mixing chamber, the pilot valve arrangement and certain of the flow passages in the valve;

FIG. 5 is a sectional view taken on the line 5—5 of FIG. 4 and partially broken away to show further details of the pilot valve structure;

FIG. 6 is a sectional view taken on the line 6—6 of FIG. 4 showing the discharge and vent passages of the valve; and FIG. 7 is a sectional view taken on the line 7—7 of FIG. 4 showing one of the valve diaphragms in detail.

Referring now to the drawings, I have shown therein a new and improved anti-siphon valve 1 which embodies my invention in one form thereof. The valve 1 is particularly adapted for use as an inlet and mixing valve in clothes washing machines. The main casing or body 2 of the valve is formed of a plurality of plastic parts 3, 4, 5 and 6. As may be best seen in FIG. 4, the parts 3 and 5 are symmetrical with the parts 4 and 6 on opposite sides of the center line 6—6. The main flow passages of the valve are formed in the central body parts 3 and 4 while the pilot systems for controlling the diaphragms of the valve include passageways in the outer parts 5 and 6 as well as in the inner parts 3 and 4. These passageways and the operation of the valve will be described in detail below. The body parts 3–6 may be formed of any suitable material and by way of example it will be understood that they may be advantageously formed of polyimides (nylon). Suitable bolts 6a (FIGS.

3 and 4) are employed to secure the parts together in the assembled valve body.

For introducing hot and cold water into the valve, the valve body includes a pair of inlets 7 and 8 formed respectively at the rear of the body parts 3 and 4. These inlets lead respectively to entrance passageways 9 and 10 which in turn connect with cross passageways 11 and 12. The cross passageways 11 and 12 lead to the undersides of valve diaphragms 13 and 14 which are held by the body parts and are positioned for engagement with valve seats 15 and 16. Referring particularly to the diaphragm 13 it is held between an annular shoulder 17 on the body part 5 and a cooperating recess 18 in the body part 3, and when the diaphragm 13 is lifted from the valve seat 15 it allows flow to pass from the passageway 11 into a duct 19 which leads into the central mixing chamber 20 of the valve. The diaphragm 14 is similarly arranged in the parts 4 and 6. Specifically, it is held between an annular flange 21 on the body part 6 and a suitable recess 21a in the body part 4, and when the diaphragm 14 is lifted off the valve seat 16 it allows flow to pass from the inlet passageway 12 to a duct 22 leading to the mixing chamber 20.

With this arrangement of the inlet passageways and the diaphragms it will be seen that no flow will pass from the inlets to the mixing chamber 20 so long as the diaphragms 13 and 14 are seated on their respective valve seats 15 and 16. However, when the diaphragms are lifted from the valve seats, flow may then pass freely through the inlet passageways over the valve seats and through the ducts 19 and 22 into the mixing chamber 20. The pilot systems for controlling the movement of the diaphragms 13 and 14 will be explained in detail hereinafter.

Turning now to an important aspect of my invention, I have provided new and improved anti-siphon means in the valve 1 whereby reverse siphoning from the valve outlet 23 to the inlets 7 and 8 is guarded against. In particular, reverse siphoning is prevented in the event a suction pressure should occur at the inlets 7 and 8 while either of the diaphragms 13 or 14 is open, i.e., is lifted off its valve seat. This anti-siphon means comprises a serpentine discharge passageway leading from the mixing chamber 20 to the outlet of the valve and a venting system which is incorporated integrally with the discharge ducting. Referring particularly to FIG. 6, it will be seen that in the valve 1 the mixing chamber 20 is located at the inner end of a serpentine discharge passageway 24 which leads to the outlet 23 of the valve. The serpentine discharge passageway includes a generally U-shaped bend or reverse curve 25 as it leaves the mixing chamber and the outlet end of this reverse curve is in turn joined to the outlet 23 by an angle section 26. It will be noted that the sides or legs 25a, 25b of the reverse curve 25 are separated from each other by means of a wall 27 formed by cooperating flanges on the body parts 3 and 4. A suitable gasket 28 is provided between the body parts 3 and 4 to prevent leakage.

The water or other liquid leaving the mixing chamber 20 flows first along the top of the wall 27 as viewed in FIG. 6. In other words, it first passes through the upper leg 25a of the reverse bend 25. Then the water flows around the bight 29 of the reverse bend at the end of the wall 27 and next it passes rearwardly along the lower surface of the wall through the short leg 25b of the reverse bend. After it passes around the U-bend 25, the discharge water then changes direction around the curve 26 and passes outwardly between the lips 30 of the outlet 23. It will be seen that the curved section 26 joining the U-bend to the outlet is greater than a right angle and is in fact about 130 degrees in the illustrated embodiment. This is to facilitate changing the direction of the outboard water stream. Referring particularly to FIG. 6 it will be seen that the serpentine discharge passageway 24 including the reverse bend section 25 and the angle 26 forms a generally S-shaped path between the mixing chamber 20 and the outlet 23. The walls of this path are formed as smooth curves and it will allow the water to pass readily under pressure from the mixing chamber to the outlet. However, due to the serpentine shape of the passageway, it presents an impedance to suds or foam being drawn upwardly from the outlet toward the mixing chamber.

To guard positively against reverse siphoning from the outlet 23 to the inlets 7 and 8 the valve 1 includes a vent or air passageway 31 which extends from the upper surface of the valve into the reverse bend portion of the discharge passageway 24. Specifically, the passageway 31 extends from the upper surface of the valve to a point adjacent the apex or bight 29 of the reverse bend section 25. The vent passageway 31 thus enters the discharge passageway upstream from the outlet at the point where the normal water flow is downwardly as viewed in FIG. 6. Thus under normal valve operation the discharge water rushes past the vent passageway around the U-bend 25 and the angled curve 26 and out the outlet 23 without leaking out through the vent passageway. However, the vent 31 joins the discharge pasageway 24 closer to the mixing chamber 20 than is the outlet 23, and the angle at which the vent joins the discharge passageway does not present much impedance to the flow of air if a suction pressure should be applied to the valve inlets. Thus, if a suction pressure is applied when the diaphragms 13 and 14 are open, air will be pulled in the vent passageway 31 and up towards the mixing chamber through the upstream leg 25a of the discharge passageway.

The drawing in of the air through the vent 31, occuring at an upstream point relative to the curves of the discharge passageway, is thus accomplished through a more direct path than can suds be drawn in through the outlet 23 from the top of the washing machine and, in effect, an air break will be provided between the mixing chamber 20 and the outlet 23. This air break or air suction effect will prevent suds or liquid being drawn into the mixing chamber through the outlet 23 and the serpentine discharge path 24, but instead will allow air to pass upwardly into the mixing chamber and then into the inlets 7 and 8 through the inlet passageways. Thereby the inlets 7 and 8 and the connected water lines will not be contaminated if a suction pressure should occur when the valve diaphragms are open. Instead of suds or liquid being pulled in through the outlet 23, air will be drawn in through the vent passageway 31 effectively breaking any suction pressure so far as the outlet is concerned and preventing contamination of the water lines. Of course, any liquid in the upper portion 25a of the discharge passageway will be drawn into the inlet with the air if a suction pressure should be applied but this water will not contaminate the incoming water lines since it has not escaped from the valve and thereby is not contaminated itself.

Thus, it will be seen that in my new and improved valve, I have provided an anti-siphon effect preventing reverse siphoning of suds, foam or liquid through the valve. Due to the serpentine configuration of the discharge passageway a difficult path for reverse flow of suds or the like is presented and with the vent passage joining the discharge passageway well upstream of the outlet and relatively near the mixing chamber, air rather than suds is drawn into the valve when a suction pressure occurs at the valve inlets. Thus air rather than suds is pulled back into the inlets and the water lines whereby contamination is avoided.

Turning now to the operation of the valve diaphragms 13 and 14, it will be understood that they could be moved relatively to their valve seats by any suitable means. However, in the illustrated embodiment they are controlled by means of a pilot system. For this purpose each of the diaphragms has one or more small bleed holes or openings provided in it, the diaphragm 13 including bleeds 33 and the diaphragm 14 including bleeds 34. These bleed openings are connected to the inlet water passageways 11 and 12 respectively and they lead to chambers 35 and 36 formed respectively over the valve diaphragms (see FIG. 4). The area of the diaphragms exposed to the chambers 35, 36 is larger than the area of the diaphragms exposed to the inlet passageways 11 and 12 and, thus, so long as the water or other liquid is at equal pressure above and below the diaphrgams, the greater area of pressure above the diaphragms will cause them to remain closed on their valve seats. In other words, the inlet water passing through the bleeds 33, 34 and filling the pressure chambers 35, 36 will force the diaphragms closed so long as there is no way for the water to escape from the pressure chambers 35, 36.

The flow of the water out of the pressure chambers 35, 36 and thereby the operation of the diaphragms 13, 14 is controlled by means of clapper valve members 37, 38 which are located in passages 39, 40, these passages being connected to the pressure chambers by means of openings 41, 42. The clapper valve members 37, 38 are mounted by means of leaf springs 43, 44 and these leaf springs normally bias the clappers inwardly so as to close the communication between the passages 39 and 40 and cooperating ducts 45, 46 which lead to the discharge passageway 24. The clappers or valve members 37, 38 normally engage suitable valve seats or ports provided at the outer ends of the passageways 45, 46 so as to close these ports and thereby maintain the inlet water pressure in the chambers 35, 36. This, of course, retains the diaphragms 13, 14 closed against their valve seats. When, however, the clapper valves 37, 38 are lifted off the valve seats at the outer ends of the ducts 45, 46, the water in chambers 35, 36 may then flow respectively to the discharge passageways through the passages 39, 40 and the ducts 45, 46. This relieves the pressure in the chambers 35, 36 and allows the diaphragms to open under the pressure from the inlets 11 and 12. With the valve diaphragms lifted off the valve seats 15, 16 the water may then flow directly from the inlets 7 and 8 through the inlet passageways and the ducts 19 and 22 into the mixing chamber 20. From the mixing chamber, the water flows through the serpentine discharge passageway 25 through the outlet 23 of the valve. Of course, if it is desired to introduce either hot or cold water but not both into the machine then only one or the other of the clapper valves 37, 38 is lifted to relieve the pressure in its associated chamber 35 or 36.

When it is desired to stop the flow of water through the valve, the clapper members 37, 38 are then returned to their normal or seated positions at the ends of the ducts 45, 46. This ends the pressure relief of the chambers 35, 36 and they again fill up. Thereby a pressure is again built up behind the diaphragms through the water introduced through the bleed holes 33, 34. As the pressure increases the diaphragms are forced to their seated positions and close off the flow until such time as the pilot valve members 37, 38 are again opened.

In order to operate the clapper valvemembers 37, 38, a pair of solenoids 47, 48 are provided on the valve. These solenoids 47, 48 are mounted on the ferromagnetic metal cover plates 49, 50 which overlie the pilot valve passages 39 and 40 (FIG. 4). The solenoids each are provided with a U-shaped yoke as indicated respectively at 51 and 52. At their rear ends, as viewed in FIGS. 1 and 4, these yokes 51, 52 are held firmly on the cover plates 49, 50 by means of screws 53, 54. At their other ends the yokes 51, 52 extend downwardly through apertures 55, 56 provided in the cover plates so that they lie immediately above corrosion resistant nonmagnetic metal plates, such as monel, 57, 58 which close the openings 55, 56 in the cover plates. With this arrangement, the magnetic circuit for each of the solenoids is from the inner end of its yoke through the monel plate into the end of the clapper valve, through a portion of the clapper valve and then outwardly to the cover plate and thence back around the outer leg of the yoke to the coil. With this magnetic circuit, the clapper member is lifted off its cooperating valve seat when the solenoid is energized and is returned to engagement with the seat when the solenoid is de-energized, the mounting springs for the clappers providing the reengagement force. The solenoids may be energized and controlled by any suitable external circuit.

Considering all of the above, it will be seen that I have provided a new and improved inlet and mixing valve particularly adapted for use in clothes washing machines. In this valve reverse siphoning is effectively guarded against. Whenever the valve diaphragms are opened by the solenoid actuated pilot valve system, water will pass freely through the valve so long as normal water pressures are maintained. However, if a suction pressure should occur at the inlets during the operation of the valve, air rather than suds, foam or liquid will be drawn into the valve and back into the inlet lines. This anti-siphon effect is provided by the curved configuration of the discharge passageway and the arrangement of the vent passageway. Although the configuration of the discharge passageway may be varied somewhat depending upon the size and length of the valve, it is important for the best anti-siphon action that the discharge passageway include at least one curve or bend therein and that the vent passage be connected at the upstream side of the curve or bend. In the illustrated embodiment the connection of the vent passageway adjacent the apex of the reverse curve portion of the serpentine discharge passageway allows air to be drawn into the valve readily when a suction pressure occurs at the inlets while suds are not easily drawn in both because of the curves of the discharge passageway and because of the air break effect provided by the air entering through the vent. Thus a very effective anti-siphon effect is achieved and at the same time a compact valve is provided which may be mounted in a limited space within the washing machine.

While in accordance with the patent statutes I have described what at present is considered to be the preferred embodiment of my invention, it will be obvious to those skilled in the art that numerous changes and modifications may be made therein without departing from my invention and it is therefore aimed in the appended claim to cover all such equivalents as fall within the true spirit and scope of my invention.

What I claim as new and desire to secure by Letters Patent of the United States is:

1. An anti-siphon mixing valve for controlling the flow of liquids, comprising a valve body including a pair of valve seats, a pair of inlets leading respectively to said valve seats, a pair of diaphragms supported by said valve body and arranged to engage said valve seats to shut off the flow from said inlets through said valve seats, separate pilot means for controlling the opening and closing of each of said diaphragms on its respective valve seat, a mixing chamber formed in said valve body and receiving the flow from both of said valve seats, and a discharge passageway leading from said mixing chamber, said discharge passageway including a reverse bend section connected to said valve seat, an outlet from said valve body and a curved section joining said reverse bend section to said outlet, whereby a roughly S-shaped path is formed for fluid flow between said mixing chamber and said outlet, a vent opening connected to said discharge passageway adjacent the apex of said reverse bend section and extending to the surface of said body, whereby if a suction pressure should occur at said valve inlet, air is drawn into said valve through said vent opening to prevent reverse siphoning of liquid or foam from said outlet, said valve body having a top, bottom and back surface and said outlet and said vent opening extend respectively through the bottom and top surfaces of said valve body, said diaphragms and said valve seats are positioned at opposite ends of said mixing chamber, said inlets both open through the back surface of said valve body to said valve seats, said valve body including a pair of molded plastic parts which are joined together to form said mixing chamber and said discharge passageway, each of said plastic parts having one of said valve seats formed therein.

References Cited

UNITED STATES PATENTS

| | | | |
|---|---|---|---|
| 2,164,622 | 7/1939 | Podolsky | 137—217 |
| 2,752,936 | 7/1956 | Cantalupo | 251—30 X |
| 2,951,503 | 9/1960 | Windsor | 137—606 |
| 1,909,336 | 5/1933 | Castle | 137—216.1 |
| 3,140,727 | 7/1964 | Cutter | 137—606 |
| 3,176,484 | 4/1965 | Shelton | 137—216.1 X |

WILLIAM F. O'DEA, *Primary Examiner.*

ISADOR WEIL, *Examiner.*

D. LAMBERT, *Assistant Examiner.*